United States Patent [19]

Shaw et al.

[11] Patent Number: 5,350,525
[45] Date of Patent: Sep. 27, 1994

[54] SYSTEM AND PROCESS FOR HYDROCYCLONE SEPARATION OF PARTICULATE SOLIDS AND AT LEAST ONE LIQUID PHASE FROM A MULTIPHASE LIQUID MIXTURE

[75] Inventors: Christopher K. Shaw, Houston, Tex.; Phillip C. Tuckett, Berwick, Australia; Bill E. Bowers, The Woodlands, Tex.

[73] Assignee: Conoco Specialty Products Inc., Houston, Tex.

[21] Appl. No.: 943,845

[22] Filed: Sep. 11, 1992

[51] Int. Cl.5 .................. B01D 17/12; B01D 17/038
[52] U.S. Cl. ............................ 210/744; 210/512.2; 210/788; 210/805
[58] Field of Search ............ 210/86, 97, 104, 195.1, 210/258, 259, 512.1, 512.2, 513, 744, 747, 787, 788, 804, 805, 806, 808; 166/267, 75.1; 209/211, 144; 55/459.1; 95/271

[56] References Cited

U.S. PATENT DOCUMENTS

| | | |
|---|---|---|
| 3,723,309 | 3/1973 | Garcia .................. 210/788 |
| 3,764,008 | 10/1973 | Darley et al. .......... 210/806 |
| 4,519,848 | 5/1985 | Underwood ............ 210/788 |
| 4,711,720 | 12/1987 | Young ................... 210/512.2 |
| 4,738,779 | 4/1988 | Carroll et al. ......... 210/512.2 |
| 4,844,817 | 7/1989 | Flanigan et al. ....... 210/788 |
| 4,900,445 | 2/1990 | Flanigan et al. ....... 210/512.1 |
| 4,995,989 | 2/1991 | Carroll et al. ......... 210/788 |
| 5,021,165 | 6/1991 | Kalnins ................. 210/703 |
| 5,032,275 | 7/1991 | Thew ................... 210/788 |

FOREIGN PATENT DOCUMENTS 1096238  6/1984  U.S.S.R. ................. 210/788

*Primary Examiner*—Joseph W. Drodge
*Attorney, Agent, or Firm*—David W. Westphal

[57] ABSTRACT

This invention relates to a system for separating a multiphase liquid mixture into a plurality of streams. The invention has particular utility in the oil industry where particulate solids are produced with an oil/water mixture. Preferably, the mixture is first cyclonically separated to remove particulate solids from the oil and water. Then the mixture is delivered to a liquid/liquid hydrocyclone where a substantial portion of the oil is separated from the remaining mixture which now primarily comprises water. The pressure of the remaining mixture is elevated such as by a pump and is then subjected to a further cyclonic separation step to remove any remaining fine solids in the mixture.

8 Claims, 1 Drawing Sheet

SYSTEM AND PROCESS FOR HYDROCYCLONE SEPARATION OF PARTICULATE SOLIDS AND AT LEAST ONE LIQUID PHASE FROM A MULTIPHASE LIQUID MIXTURE

FIELD OF THE INVENTION

This invention relates to equipment and processes for separating particulate solids from a liquid and for separating one liquid phase from another, and more particularly to separating a hydrocarbon well production stream including sand or the like into separate streams of particulate solids, an oil phase and a water phase.

BACKGROUND AND SUMMARY OF THE INVENTION

In the production of hydrocarbons from a well in a petroleum bearing underground formation, it is typical, especially in water flood recovery operations, that water is produced with the oil and gas. In water flood operations, water can comprise a significant portion and sometimes a majority of the produced fluids. As the water comprises a large constituent, substantial costs may be avoided by separating water from the stream at the production facility rather than handling the extra volume. In an offshore production operation where space weight and capacity are limited and the costs of transporting the production stream to shore may be significant, the cost savings may be extremely significant.

Water is not the only impurity that must be removed from the production fluids. In sandy formations, particulate solids may be produced in the fluid stream. such sand can cause significant problems in production equipment such as abrasion and wear as well as clogging valves and other process equipment. It is desirable to separate the sand for discharge or reinjection. Clearly a system for separating the water and sand would preferably be small lightweight and efficient as well as provide very clean products that can be disposed of in an environmentally sound manner.

Various equipment is available to separate oil from water such as liquid/liquid hydrocyclones which operate very efficiently and that do not have the weight or space requirements of gravity separation devices. Such hydrocyclones are sometimes coupled with other equipment in a system that provides enhanced operation. For example, U.S. Pat. No. 5,021,165 discloses a hydrocyclone in combination with a flotation device that provides a secondary gravity separation of the underflow from the hydrocyclone to provide additional clarification of the water phase. It should be noted that the patent additionally discloses that the system can include a hydrocyclone of the type for separating solids between the liquid/liquid hydrocyclone and the flotation device.

Various equipment is also known for separating solids from liquids. For example U.S. Pat. No. 3,764,008 illustrates a system for cleaning sand from a production stream using two successive solid/liquid hydrocyclones.

In some cases, however, the production stream is not provided from the well at sufficient pressure to operate the complete system to separate the multiphase stream into its various components. Each hydrocyclone requires a certain pressure drop to efficiently separate the components. In addition, some production streams contain dissolved carbon dioxide which may bubble out under the reduced pressure outside the formation. Such carbon dioxide may permit the formation of scale which could clog subsequent valves and process equipment. Moreover, if it is desirable to reinject the water, the scale must be removed or prevented by chemicals or other means as it may clog interstices in the formation reducing the potential productivity of the well.

Accordingly, it is an object of the present invention to provide a method and apparatus for separating a multiphase fluid stream comprising a heavy phase liquid component, a lighter phase liquid component, and a particulate solids component into a plurality of separately classifiable streams which avoids the above noted drawbacks.

The above and other objects of the invention are achieved by the provision of a method and system which separates at least a portion of a multiphase liquid mixture into at least a lighter phase liquid stream and a heavier phase liquid stream. At least a portion of the heavier phase liquid stream is cyclonically separated into an overflow and an underflow wherein the overflow comprises a relatively greater concentration of lighter phase liquid component compared to the heavier phase liquid stream prior to the cyclonic separation. The pressure of at least a portion of the underflow from the cyclonic separation is elevated to a higher pressure and at least a portion of the higher pressure underflow is separated into at least two streams, where one of the streams comprises a greater concentration of at least one component than the other stream.

BRIEF DESCRIPTION OF THE DRAWINGS

Some of the objects have been stated and others will appear as the description proceeds, when taken in conjunction with the accompanying drawing in which—

DETAILED DESCRIPTION OF THE PREFERRED EMBODIMENTS

Figure 1:
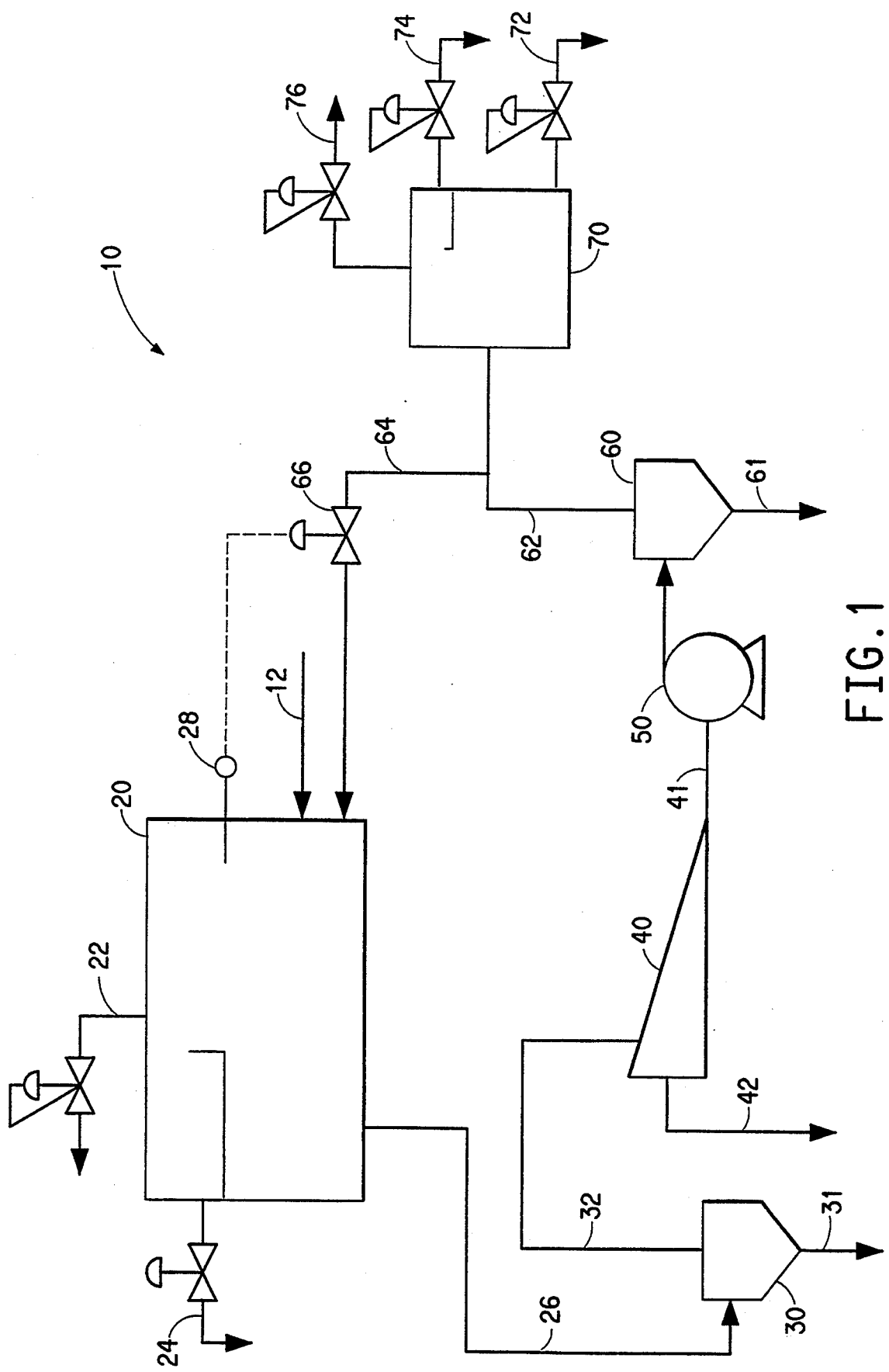
FIG. 1 is schematic illustration of the fluid treatment apparatus embodying features of the present invention.

Referring now more particularly to the drawing, FIG. 1 illustrates a preferred embodiment of a system, generally indicated at 10 for separating the particulate solids and oil and water components of a production stream from an oil well. It should be recognized that the described system has applicability to fluid streams containing particulate solids, a lighter and heavier density liquid components. Accordingly, the following description relating to the separation of oil and water in a well production stream should not be construed as limiting.

In the system 10, the fluid mixture is received via a conduit 12 into a primary separation device 20. As illustrated, the primary separation device 20 is a three phase gravity separator including a gas outlet 22, an oil leg outlet 24 and a water leg outlet 26. It should be noted that the use of a three phase gravity separator to receive the well production stream is known in the industry and that other equipment is known and used for essentially the same function. However, it is preferred to have some equipment set up to receive the irregular flow from the well and provide an initial separation of the production stream. The primary separation device 20 is shown to have an optional level sensor 28 for sensing the liquid level therein and for initiating the recycle of fluid to replenish the primary separation device 20 should the liquid level fall below a predetermined level as will be explained below. The primary separation device 20 preferably has a substantial capacity to permit better separation therein as well as to provide a steady supply of the multiphase liquid stream out the liquid leg 26 for the hydrocyclones as will be described below.

As may have been implied above, the fluid in the water leg 26 from the primary separation device 20 is not clean water but comprises water, oil and sand as well as perhaps other components. The fluid in the water leg 26 must be further cleaned up before the water can be discharged. The fluid in the water leg 26 is therefore a multiphase liquid having a particle solids component similar to the original production stream but simply having a different concentration of the components than the original production stream.

The fluid in the water leg 26 is directed into a coarse desanding solid/liquid hydrocyclone 30 to separate coarse particles that may cause excessive abrasion to successive process equipment. The coarse desanding hydrocyclone 30 separates the stream into a particle rich slurry underflow 31 and a liquid overflow 32. The underflow 31 may be subjected to further cleaning to meet environmental conditions but is otherwise separated from the illustrated system. The liquid overflow 32 may or may not still contain fine sand particles. The coarse solid/liquid hydrocyclone 30 is designed, constructed and arranged to separate the heavier solid particles from a substantially coarse solids free liquid.

The liquid overflow 32 from the coarse solid/liquid hydrocyclone 30 is delivered to a liquid/liquid hydrocyclone 40 for separating the liquid stream into a heavier liquid phase carried out via underflow conduit 41 and a lighter liquid phase carried out via overflow conduit 42. The liquid/liquid hydrocyclone is designed constructed and arranged to separate a heavier phase liquid from a lighter phase liquid. Such hydrocyclones tend to have a very long slightly tapered internal geometry compared to the short, highly tapered geometry of a coarse solid/liquid hydrocyclone. The oil phase is carried from the liquid/liquid hydrocyclone 40 via overflow conduit 42 for inclusion into the oil production stream or may be further processed, but is otherwise separated from the illustrated system.

The heavy water phase is carried via the underflow conduit 41 to a pump 50 to elevate the pressure of the stream. The pump draws the heavy water phase from the liquid/liquid hydrocyclone 40 and delivers it via high pressure conduit 51 into a second desander solid/liquid hydrocyclone 60 for separating remaining fine particles in the stream. The location of the pump 50 is believed to be important since there is believed to be substantial benefit for the system 10. As the pump 50 is downstream of the liquid/liquid hydrocyclone 40, it does not shear the oil droplets and does not significantly impair the efficiency of the solid/liquid hydrocyclone 60. Moreover, the pump 50 provides sufficient pressure to operate the fine desanding hydrocyclone 60, and prevents the pressure in the stream from dropping down to an unnecessarily low pressure which might permit the formation of scale.

The fine desanding solid/liquid hydrocyclone 60 separates the stream into a particle rich slurry of sand carried out therefrom via an underflow conduit 61 and a clean relatively solids free water carried out therefrom via an overflow conduit 62. The fine desander is designed, constructed and arranged to separate fine particulate solids from a liquid. It may be very similar to the coarse desander but may have a slightly different geometry to separate the finer particles. Such details are believed to known or readily available to those knowledgeable in the solid/liquid hydrocyclone art. The solids may be subjected to further cleaning for disposal or may be clean enough for immediate disposal, but is otherwise separated from the illustrated system.

The relatively clean water in conduit 62 may be handled a number of ways. As clean water, it may be discharged overboard, or as indicated in FIG. 1, it may be subjected to a final assurance pass through a downstream enhancement vessel 70. The downstream enhancement vessel 70 may be any type of vessel or device capable of separating oil from water. In the instant case, the downstream enhancement vessel 70 is in the form of a three phase gravity separator. Accordingly, there is a clean water leg 72, and oil leg 74 and a gas outlet 76.

It should be noted that the system includes a number of outlets for various streams to be separated from the illustrated system. From each outlet, a stream of classifiable fluid is separated. In particular, there is a coarse solids outlet at 31, oil outlets at 24, 42, and 74, a fine solids outlet at 61, a water outlet at 72, and gas outlets 22 and 76.

The system 10 may optionally be provided with a recycle loop. As previously discussed, the level of fluid in the primary separation device 20 may be monitored by level sensor 28. When the sensor 28 senses a low fluid level, level control valve 66 is actuated to open and permit some of the higher pressure liquid from downstream of the pump 50 to recycle back into the primary separation device 20 via conduit 64.

In the foregoing specification and the attached drawings, there has been set forth preferred embodiments of the invention. Although specific terms are employed, they are used in a generic and descriptive sense only and should not be limiting to the invention.

We claim:

1. A process for separating a multiphase liquid mixture comprising a heavy phase liquid component, a lighter phase liquid component and a particulate solids component into a plurality of separately classifiable streams, wherein the process comprises the steps of:
   (a) cyclonically separating at least a portion of the mixture into a first portion and a second portion wherein the first portion comprises a relatively greater concentration of particulate solids component compared to the multiphase liquid mixture;
   (b) cyclonically separating at least a portion of the second portion into an overflow and an underflow wherein the overflow comprises a relatively greater concentration of lighter phase liquid component compared to the multiphase liquid mixture;
   (c) cyclonically separating a substantial portion of any remaining particulate solids from at least a portion of said underflow; and
   (d) elevating the pressure of the underflow from the cyclonically separating step prior to said step of separating remaining particulate solids;
   the process excluding said first portion from step (a) being further separated in equipment provided for cyclonic separation in steps (b) or (c).

2. The process according to claim 1 further comprising separating the multiphase liquid mixture into at least a lighter phase liquid stream and a heavier phase liquid stream prior to said step (a) and providing the heavier phase liquid stream to said step (a).

3. The process according to claim 1 further comprising the step of separating an overflow stream from said step (c) into lighter and heavier density liquid portions.

4. The process according to claim 1 further including the step of providing the multiphase liquid mixture to a vessel prior to cyclonic separation step (a), and wherein the process further comprises sensing the fluid level in the vessel and recycling at least a portion of the higher pressure underflow from downstream of the step of elevating the pressure.

5. A process for separating a production stream from an oil well comprising a heavier phase component, a lighter phase component and a particulate solids component into a plurality of separately classifiable streams, wherein the process comprises the steps of:

(a) separating at least a portion of the production stream into at least a lighter phase liquid stream and a heavier phase liquid stream;

(b) cyclonically separating at least a portion of the heavier phase liquid stream into a particulate solids stream and a liquid mixture stream;

(c) cyclonically separating at least a portion of the liquid mixture stream from step (b) into an overflow and an underflow wherein the overflow comprises a relatively greater concentration of lighter phase liquid component compared to such concentration in the heavier phase liquid stream produced in step (a);

(d) elevating the pressure of at least a portion of the underflow produced in step (b) to a higher pressure; and (e) cyclonically separating particulate solids from at least a portion of the higher pressure underflow from step (c); and (f) separating a substantially particulate solids free mixture resulting from step (e) into lighter and heavier phase liquid portions;

the process excluding said particulate solids stream from said step (b) being further separated in equipment provided for cyclonic separation in steps (c) or (e).

6. A system for separating a multiphase liquid mixture comprising a heavy phase liquid component, a lighter phase liquid component and a particulate solids component into a plurality of separately classifiable streams, wherein the apparatus comprises:

first separation means for cyclonically separating the mixture into a first portion and a second portion wherein the first portion comprises a relatively greater concentration of particulate solids compared to the multiphase liquid mixture;

second separation means for cyclonically separating the second portion from said first separation means into an overflow and an underflow wherein the overflow comprises a greater proportion of lighter phase liquid to heavier phase liquid than the underflow;

means for elevating the pressure of the underflow; and third separation means for cyclonically separating a substantial portion of any remaining particulate solids from the elevated pressure underflow; and wherein said system does not include means for directing said first portion from said first separation means to either of said second or third separation means.

7. The system according to claim 6 further comprising a gravity separation means for further separating a substantially solids free liquid mixture outletted from said third separation means into lighter and heavier phase liquid portions.

8. The system according to claim 6 further comprising a vessel upstream of said first separation means wherein said vessel is provided with the multiphase liquid mixture therein and wherein the system further comprises means for sensing the fluid level in said vessel and means for recycling at least a portion of the elevated pressure underflow from downstream of said means for elevating the pressure.

* * * * *